United States Patent [19]

Meader, Jr. et al.

[11] 4,025,683

[45] May 24, 1977

[54] URETHANE-BASED WATER-PROOFING/SOUND-PROOFING COATING COMPOSITION

[75] Inventors: Arthur L. Meader, Jr., Berkeley; William L. Runyon, Jr., Richmond, both of Calif.

[73] Assignee: Chevron Research Company, San Francisco, Calif.

[22] Filed: Aug. 15, 1975

[21] Appl. No.: 605,102

Related U.S. Application Data

[63] Continuation-in-part of Ser. No. 396,042, Sept. 10, 1973, Pat. No. 3,900,687.

[52] U.S. Cl. .............................. 428/215; 427/136; 427/138; 427/407 R; 428/339; 428/425
[51] Int. Cl.$^2$ ............... B05D 1/36; B32B 27/40; B32B 11/04
[58] Field of Search ............... 427/138, 407 R, 417, 427/136; 428/425, 489, 215, 339; 181/33 GA; 404/32, 75

[56] References Cited

UNITED STATES PATENTS

| | | | |
|---|---|---|---|
| 3,110,981 | 11/1963 | Larner | 428/425 |
| 3,253,521 | 5/1966 | Endres | 404/32 |
| 3,272,098 | 9/1966 | Buchholtz et al. | 427/136 |
| 3,499,783 | 3/1970 | Nelson et al. | 427/385 |
| 3,756,845 | 9/1973 | Zasadny et al. | 428/425 |

Primary Examiner—James R. Hoffman
Attorney, Agent, or Firm—C. J. Tonkin; J. T. Brooks

[57] ABSTRACT

A water-proofing/sound-proofing coating composition comprises, in order, from a surface to be coated (A) a prime coat comprising (1) a paint binder, (2) a heat absorber, comprising a dark, preferably black, pigment, (3) a volatile solvent, and optionally (4) an inert filler, and (B) a membrane coat comprising (1) a polyurethane formed from (a) a mixture of high molecular weight polyols and low molecular weight chain stiffeners and (b) a polyisocyanate, (2) a nonvolatile extender and (3) a volatile solvent. The surfacing composition can also include an overlay of a wearing surface such as an asphalt concrete. A process is also provided for preparing a cast-in-place surfacing composition comprising (A) applying a primer to a surface to be coated, (B) allowing the prime coat to stand for a time sufficient to allow entrained gases to escape from the primed surface, and (C) applying to the surface of the prime coat a membrane-forming coat comprising (1) a mixture of a high molecular weight polyol and a low molecular weight chain stiffener, (2) a substantially inert nonvolatile extender, (3) a polyisocyanate, (4) a volatile solvent, and (5) a polyurethane-forming reaction catalyst.

14 Claims, No Drawings

URETHANE-BASED WATER-PROOFING/SOUND-PROOFING COATING COMPOSITION

RELATED APPLICATION

This application is a continuation-in-part of U.S. application Ser. No. 396,042, filed Sept. 10, 1973, now U.S. Pat. No. 3,900,687.

BACKGROUND OF THE INVENTION

1. Field of the Invention

A common problem in areas where freezing temperatures occur is a tendency for bridges to freeze over while the roads on either side of the bridge remain unfrozen. This is because the bridge deck cools very quickly while the roadbed is both insulated and warmed by the earth upon which it rests. Since bridge decks freeze over sooner than the rest of the highway, the unwary motorist is faced with a very real hazard.

To combat the hazard presented by frozen bridge decks, highway maintenance crews often spread a salt such as sodium chloride or calcium chloride on the surface of the bridge. While salting reduces this hazard, it creates the problem of salt water. Bridge decks, normally constructed with Portland cement concrete, are somewhat porous. The salt water diffuses into this porous material. When it reaches the metal reinforcing bars within the concrete, corrosion occurs. Corrosion causes an increase in volume of the reinforcing metal. The resulting pressure on the concrete results in pop-outs and delaminations, sometimes over very large areas. The salt water also causes scaling which is a form of surface erosion. When the damage is severe enough, complete reconstruction of the bridge deck is required. This can involve removal of the old bridge deck and replacement with an entirely new deck. Where concrete supporting pillars are used, complete demolition and reconstruction of the bridge may be necessary.

Similar problems occur wherever decks and the like are supported above ground and are exposed to freezing temperatures such as in multilevel car parking facilities.

Since the major problem is salt water seeping into the porous structure, sealing coats have been applied to bridge decks and the like to "seal out" the salt water. A problem experienced in applying these seal coats is bubble formation in the coating. This problem is particularly severe with concrete containing high percentages of entrained air. Before the mid-1960's concrete bridge decks contained very little air, usually less than 4%. Since then, concrete, particularly that used to form bridge decks, was required to have about 6 to about 6.5% entrained air to provide resistance to scaling. Seal coats applied over concrete containing these high percentages of air suffer severe air bubble formation problems. The bubbles are very difficult to remove and in most cases their removal destroys the integrity of the seal coat. On the other hand, if the bubbles are not removed the seal coat is considerably weakened at these points.

Bubble formation is not such a severe problem with preformed membranes which are "glued" in place. However, these require considerable labor, are subject to wrinkling problems during application and in some cases are subject to adhesion problems with asphalt concrete overlays.

What is needed is a low cost sealing composition which is inexpensive to install, tough, impermeable to salt water and not subject to bubble formation.

This invention is directed toward such a surfacing composition for bridge decks and the like. It is competitive in cost with other seal coat systems, tough, durable, impermeable to salt water and subject only to very minimal bubble formation. In addition when applied to surfaces, whether or not porous, it provides an excellent sound deadening effect.

SUMMARY OF THE INVENTION

A cast-in-place surfacing composition is provided which comprises, in order, from a surface to be coated: (A) a prime coat comprising (1) a paint binder, (2) a heat absorber, comprising a dark, preferably black, pigment, (3) a volatile solvent, and optionally (4) an inert filler, and (B) a membrane coat comprising (1) a substantially inert nonvolatile extender, (2) a volatile solvent, and (3) a polyurethane formed by reacting a mixture of a high molecular weight polyol and a low molecular weight chain stiffener with a polyisocyanate.

A process is provided for preparing the cast-in-place surfacing composition which comprises (A) applying a primer to the surface to be coated, which comprises (1) a paint vehicle, (2) a heat absorber, comprising a dark, preferably black, pigment, (3) a volatile solvent, and optionally (4) an inert filler, (B) allowing the prime coat to stand for a time sufficient to allow entrained gases to escape from the prime coat and the primed surface (a minimum of two hours) and (C) applying after the sun has reached its zenith, and during a period of falling surface temperature, a membrane-forming coat to the prime coat which comprises (1) a substantially inert nonvolatile extender, (2) a polyurethane precursor comprising a mixture of a high molecular weight polyol and a low molecular weight chain stiffener, (3) a polyisocyanate, (4) a volatile solvent, and (5) a polyurethane-forming reaction catalyst.

If the coated surface is subject to heavy wear such as heavy vehicular traffic, snow plowing, tire chains or other severe abuse, a wearing surface should be applied over the membrane coat. Particularly on bridges, asphalt concrete provides an excellent wearing surface.

In light use areas such as parking decks and in sound deadening applications the highly durable membrane coat provides a satisfactory wearing surface. For long-term protection from ultraviolet degradation as for decorative reasons, a coating may be applied to the surface, or aggregate may be sprinkled on the membrane before it has cured.

DETAILED DESCRIPTION OF THE INVENTION

The cast-in-place surfacing composition of the invention comprises, in order from the coated surface, (A) a prime coat comprising 15 to 70, preferably 25 to 50 parts by weight of (1) a paint binder, 2 to 70, preferably 2-50 parts by weight of (2) a heat absorber, comprising a dark, preferably black, pigment, 0 to 50, preferably 10 to 40 parts by weight of (3) a substantially inert filler, and 20 to 75, preferably 25 to 50 parts by weight of (4) a volatile solvent, and (B) a membrane coat comprising 20 to 80, preferably 40 to 60 parts by weight of (1) a polyurethane formed by reacting 15 to 60, preferably 30 to 55 parts by weight of (a) a polyurethane precursor with 6 to 20, preferably 10 to 15 parts by weight of (b) a polyisocyanate, 20 to 80, preferably 40 to 60 parts by weight of (2) a substantially inert nonvolatile extender, and 0 to 20, preferably 0 to 10 parts of (3) a volatile solvent. The polyurethane precursor of the membrane coat comprises a mixture of 15 to 60, preferably 30 to 55 parts by weight of a high molecular weight polyol and 2 to 10, preferably 4 to 8 parts by weight of a low molecular weight chain stiffener.

In a preferred embodiment the cast-in-place surfacing composition of the invention includes, in addition to (A) the prime coat and (B) the membrane coat, (C) a tack coat and (D) a wearing surface overlay.

The process for preparing the cast-in-place surfacing composition of the invention comprises (A) applying prime coat to the surface which prime coat comprises 15 to 70, preferably 25 to 50 parts by weight of (1) a paint vehicle, 2 to 70, preferably 2–50 parts by weight of (2) a heat absorber, comprising a dark, preferably black, pigment, preferably 10 to 40 parts by weight of (3) a substantially inert filler and 20 to 75, preferably 25 to 50 parts by weight of (4) a volatile solvent, and (B) allowing the seal-forming coat to stand for a time (preferably 2 to 4 hours) sufficient to allow entrained gases to escape from the primed surface, and (C) applying after the sun has reached its zenith, and during a period of falling surface temperatures, to the surface of the prime coat at membrane-forming coat comprising 20 to 80, preferably 40 to 60, parts by weight of (1) a substantially inert nonvolatile extender, 15 to 60, preferably 30 to 55 parts by weight of (2) a polyurethane precursor, (3) 6 to 20, preferably 10 to 15 parts by weight of a polyisocyanate, 0 to 20, preferably 0 to 10 parts by weight of (4) a volatile solvent, and (5) 0 to 2, preferably 0.01 to 1.0 parts by weight of a polyurethane-forming reaction catalyst, in which the polyurethane precursors of the seal coat and membrane coat are as described above.

The surfacing compositions of the invention are prepared by applying a prime coat to the surface to be coated. Application is conveniently by spraying a solution of the primer in a volatile solvent. Preferably the solvent evaporates within about ½ hour after application under normal working conditions (e.g. above 50° F).

The binder in the prime coat may be any of the conventionally employee binder materials used in paints such as acrylic resins, alkyl resins, chlorinated rubber, linseed oil, ethylenevinylacetate copolymer resins, phenol formaldehyde resins, etc.

The prime coat contains a dark, preferably black, filler, such as carbon black, black iron oxide, or asphalt, which acts as a heat absorber. Preferably it is applied on a sunny day. The black material absorbs heat from the sun's radiation raising the surface temperature by as much as 30°–40° F. The air in the bridge deck surface pores will then be rapidly driven out through expansion caused by the heating. When the membrane coat is applied over the dark colored prime coat the temperature of the surface either remains constant or starts to fall. If sufficient time has elapsed to allow the air to escape, there will be no further expansion of air within the concrete deck, and as the temperature starts to fall, there will actually be a contraction of the air in the concrete. The contracting air does not cause bubbles and blisters in the membrane coat as it cures. Most preferably the prime coat is applied in the morning house when the sun is high enough in the sky to heat the surface rapidly but soon will be at its zenith so that the temperature starts to decrease, thus causing contraction of the air in the surface pores and minimizing bubble formation. These falling temperature applications yield excellent, nearly bubble-free coatings.

After the prime coat is applied and allowed to stand for a sufficient time to allow the entrained air in the bridge deck surface to escape, a minimum of two hours, and not before the sun has reached its zenith, and in a period of falling temperature, a membrane-forming coat is applied over the coat. The membrane-forming coat contains a substantially inert non-volatile extender and polyurethane-forming materials. The polyurethane-forming materials include a high molecular weight polyol and a low molecular weight chain stiffener. In addition a polyisocyanate and a polyurethane-forming reaction catalyst are present. The quantity of polyisocyanate is adjusted such that there are sufficient isocyanate groups to react with the isocyanate reactive groups of the polyol and chain stiffener of the membrane-forming coat.

The membrane-forming coat is ordinarily dark in color. If it is applied directly to the concrete it will absorb the sun's heat and cause a jump in the surface temperature with a concomitant release of air bubbles from the concrete. These bubbles do not disengage easily from the curing membrane and they consequently result in imperfections. If on the other hand a heat-absorbing prime coat is first applied to the concrete, the surface temperature has already been raised as high as the sun's rays will take it before the membrane coat is applied. The membrane coat will therefore cause no further temperature rise, no air bubbles will be released, and a coherent, impermeable membrane will result.

The membrane-forming coat is applied at a thickness of about 1/50 to about ½ inch, preferably 1/32 to about ⅜ inch, more preferably about one-twentieth to one-fourth of an inch.

Preferably, when the membrane will be subjected to heavy wear, such as on highway bridges and the like, a protective surface is applied after the membrane coat cures. Asphaltic concrete provides an excellent protective surface. It can be applied in any suitable form such as a hot mix or an emulsion mix. Preferably it is applied as a hot mix, but the temperature should not exceed 400° F and preferably not be above 325° F. The thickness of the protective surface used will depend on a variety of considerations, one of which is the dead weight which the surfacing composition represents. For example, on bridges, it is very desirable to minimize the dead weight which the bridge must support. For most of the surfacing operations on bridge decks two lifts 1½ inches thick of asphaltic concrete are preferred. This provides a highly durable wearing surface without increasing the dead weight on the bridge excessively.

A tack coat should be used to improve adhesion of the asphaltic concrete to the membrane coat. Any material which accomplishes this objective is suitable. A thick coat of an asphalt sprayed on in the molten state has been found to be a very satisfactory tack coat. The tack coat application temperature also should not exceed 400° F, preferably 325° F. Suitable asphalts have penetration values of 50–150 at 77° F, and preferably 70–110. A particularly useful asphalt is one having a penetration of 85/100.

Immediately following application of the tack coat, preferably while it is still tacky, a hot asphaltic concrete mix is applied according to standard paving techniques which usually includes compaction after each lift is applied. The total thickness of the protective surface can be built up as desired. Preferably, the asphalt concrete comprises 3 to 12 parts by weight of an asphalt having a penetration of 70 to 150 and 88 to 97 parts by weight of a mineral aggregate.

Prime Coat

The prime coat is applied to the porous sub-base to convert the surface from a light-colored to a dark-colored surface, so that it will raise the temperatures of the surface and cause expansion of air in the pores.

The prime coat is applied in a relatively thin layer so that the air bubbles can easily reach the surface and escape. The prime coat will usually be applied at a thickness of from about 0.0005 to 0.020 inch, preferably from about 0.001 to 0.010 inch. Under normal conditions on a normally porous surface (concrete having up to 6–7% entrained air), about 0.03 gallon per square yard of nominal surface area yields satisfactory results. Of course, a rougher or more porous surface will require more and a smooth surface will require less of the prime coat.

Two specific preferred compositions have the following formulations:

| PRIME COATS | |
| --- | --- |
| Material | Parts by Weight |
| Composition 1 | |
| An alkylated phenol-formaldehyde/tung oil varnish | 40 |
| Carbon Black | 2.5 |
| Paint Thinner (350° mid-point) | 60 |
| Composition 2 | |
| An alkyd resin | 25 |
| Carbon Black | 5 |
| Powdered Limestone | 40 |
| Paint Thinner | 50 |
| Thickener | 4 |

Membrane Coat

Preferred membrane coats have certain properties. The membrane should cure completely even when applied in relatively thick layers (up to about 1 inch). The membrane should not be dependent upon loss of solvent or water or upon absorption of moisture or other gases from the atmosphere for its cure. Two-part urethanes are particularly good in this respect. The membrane material after cure must also have good tensile strength, good elongation properties, and high tear strength. Furthermore, these properties must be exhibited over temperatures ranging from −20° F, and even lower, to 140° F (the temperature reached by black highway surfaces in the summer sun). Further, the material must be capable of withstanding application of hot protective surface such as hot-mix asphalt concretes, which are applied at temperatures up to 325°–400° F. The material must also form a good bond with the prime coat and with the intended protective surface overlays such as the asphaltic concrete.

Membranes which satisfactorily meet these requirements are comprises of from 35–65 parts of a suitable extender and from 65–35 parts of a polyurethane. Fillers may be added as desired to fulfill other requirements. For instance, carbon black can be added to improve ultraviolet resistance where a protective surface is not applied. Calcium oxide or similar materials can be used as a desiccant to prevent foaming of the polyurethanes caused by reaction of the polyisocyanate with any water present. Clay may be added to improve tear strength. In addition small amounts of catalyst may be used to promote the polyurethane-forming reaction.

The Extender

A variety of cut back asphalts are suitable. Cut back asphalts are mixtures of asphalt and a volatile solvent. Suitable asphalts include those having penetrations of from 40 to about 200, preferably 50 to about 150. A particularly useful asphalt for use in this invention is one having a penetration of 85/100 at 77° F. The solvents used in preparing cut back asphalts are generally volatile; that is, they usually have boiling points such that they evaporate from the asphalt within a short period after the asphalt cut back is spread out to form a surface. Excellent, inexpensive cut back solvents are available as certain fractions from petroleum refining.

The polyurethane precursors can be mixed with an extender oil instead of, or in addition to, the cut back asphalt. A wide variety of extender oils are suitable for this purpose. The oil should not bleed or exude from the polyurethane ultimately prepared from the polyols. It also must be compatible with the polyol and other constituents added thereto. Oils having a substantial aromatic component are more miscible with the polyol component and the polyurethane ultimately prepared from it. Oils having an aniline point of from about 75° to about 140° F are preferred. A particularly useful extender oil is the extract from a side cut in the manufacture of lube oils wherein phenol is used to extract aromatics. The resulting extract has a viscosity of about 2100 SUS at 100° F, and an aniline point of 100° F.

A particularly preferred extender for the membrane coat is a cut back asphalt consisting of 80 volumes of 85/100 penetration asphalt, and 20 volumes of a largely aliphatic low-boiling petroleum hydrocarbon having the midpoint of its boiling range at 265° F.

Volatile Solvent

The prime coat and membrane coat contain volatile solvent to lower the viscosity of the mixture sufficiently to improve handling characteristics and spreadability. Most of this solvent will ultimately evaporate from prime coat before application of the membrane coat and from the membrane coat during and after curing. Suitable solvents include the aliphatic low-boiling petroleum hydrocarbon mentioned above in the exemplary prime coat compositions as well as toluene, xylene, low boiling ketones such as methyl ethyl ketone and other low boiling aliphatic hydrocarbons such as hexane, heptane, cyclohexane and the like.

The Polyurethane

The polyurethane of the membrane coat is prepared by reacting a polyisocyanate with a polyurethane precursor. The precursor is a blend of a high molecular weight polyol and a low molecular weight chain stiffener. The low molecular weight moiety provides increased tensile strength, tear strength, and modulus.

The High Molecular Weight Polyols

The high molecular weight polyols are primarily diols, although there may be minor amounts of higher order polyols present. High molecular weight polyols will generally have at least a molecular of 1500 and will not exceed a molecular weight of about 5000. Preferably, they have a molecular weight ranging from about 2000–4000, and most preferably, from about 2,200–3,000. At least two of the hydroxyl groups will usually be at, or near (within about 4 carbon atoms of) the terminal carbon atoms, and will be separated by hydrocarbon chains of at least 40 carbon atoms. The hydrocarbon group is amorphous, that is relatively free of crystallizable areas.

The hydrocarbon chain can be readily prepared by polymerizing anionic addition polymerizable olefins using a metallo-organic catalyst. See, for example, Hayashi et al, "Journal of Polymer Science", part A, 2, 2,571–2,594 (64) and U.S. Pat. No. 3,055,952. The hydroxyl groups may be introduced at the terminal ends of the polymer, by oxidation, or addition of aldehydes, ketones, or oxides. Preferably, the diols are primary alcohols. Free radical polymerization using hydrogen peroxide in an alcohol may also be used.

Polyols may be derived from such monomers as butadiene, styrene, isoprene, and alpha-methylstyrene, or t-butylstyrene, 2-ethylbutadiene, etc. Normally, the olefins will contain from about 4–10 carbon atoms. Preferably, the polymer is a polybutadiene.

The Low Molecular Weight Chain Stiffener

As stated above, the low molecular weight chain stiffeners are incorporated in the polyurethane to enhance the physical properties. These chain stiffeners include polyols, polyamines or hydroxyamines. They will generally have from about 2–12 atoms separating the most distant hydroxyl and/or amine groups and will normally contain from 4–18 carbon atoms. The atoms intermediate of the hydroxyl groups and/or amine groups, besides carbon, may be oxygen, nitrogen or sulfur. Generally they will contain from 0–2 hetero atoms.

Examples of suitable chain stiffeners include 3-dimethyl-amino-1,2-propanediol, 1,4-di-(hydroxymethyl) cyclohexane, 1,4-butanediol, 4,4'-methylenedianiline, diethanolamine, tolidine, 3-methyl-1,5-pentanediol, trimethylolpropane, glycerine, ethylene glycol, triethanolamine, diethyleneglycol, N,N,N',N'-tetra kis (2-hydroxypropyl) ethylenediamine and N,N-bis-(2-hydroxypropyl) aniline of which the last is preferred. The mol ratio of the isocyanate reactive groups of the low molecular weight chain stiffener to the isocyanate reactive groups of the high molecular weight polyol will range from 0–3:1, and preferably be about 1.5–2.5:1.

Polyisocyanate

The polyisocyanates will generally be diisocyanates or mixtures of diisocyanates with higher orders of polyisocyanates, normally not exceeding 5 isocyanate groups. Usually, in mixtures of di- and higher order polyisocyanates, the higher order polyisocyanates will be present in not more than 50 equivalent percent, usually not more than 20 equivalent percent. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyl diisocyanate, bis(isocyanatophenyl) methane, 1,5-naphthalene diisocyanate, polyphenyl polymethylene isocyanate (PAPI, supplied by Upjohn Co.), toluene diisocyanate (TDI), hexamethylene diisocyanate, dodecamethylene diisocyanate, 1,4-diisocyanatocyclohexane, poly (methylene phenylene polyisocyanate). The last polyisocyanate is preferred.

The ratio of isocyanate groups to isocyanate reactive groups (hereinafter referred to as the NCO/OH ratio) used to form the polyurethane in the membrane coat is normally in the range of 0.8–1.4/1.0, preferably 1.05–1.15/1.0.

Catalyst

Catalysts, when used, are present in sufficient quantity to cause curing of the polyurethane as desired. The particular usage level is easily determined by simple experimentation. Generally the usage level will range from about 0.005 to about 0.2 weight percent of the total composition. Suitable catalysts include dibutyl tin dilaurate, diazabicyclooctane, stannous octoate, etc. The dibutyl tin dilaurate is preferred.

The Heat Absorber

The prime coat contains a heat absorber. This material causes absorption of heat radiation from the sun's radiation, thereby increasing the temperature of the surface to which it is applied. Suitable heat absorbers are dark in color, preferably black. The asphalt of the cutback asphalt extender is dark and functions as a heat absorber. Preferably this dark color is supplemented with another material such as carbon black, lamp black, black iron oxide, and the like.

Inert Fillers

The prime coat and membrane coat can include one or more inert fillers such as calcium carbonate, magnesium carbonate, clays, whiting, silica, calcium oxide, carbon black, etc. The latter two materials are also discussed under drying agents and heat absorbers, respectively.

Other Materials

Carbon black can be added to improve the ultraviolet resistance of the membrane coat. It can also be present in the prime coat to act as a heat absorber for warming the bridge deck.

Carbon black having a mean particle diameter of from about 10 to about 70 millimicrons is quite suitable for dispersion in the prime coat and membrane coat materials. Particularly preferred are carbon blacks having a mean particle diameter of from about 20 to about 55 millimicrons.

Dispersing the carbon black in the prime coat and membrane coat materials can be somewhat difficult due to its fine particle size. Preferably, it is introduced into the extender prior to addition of any other prime coat or membrane component. The extender and carbon black are then circulated through a high shear pump or colloid mill until complete dispersion is achieved.

Drying agents are advantageously used to minimize the amount of water present in the premix. The polyisocyanate reacts with the water and evolves carbon dioxide. Aside from the loss of the expensive polyisocyanate through this side reaction, the carbon dioxide can cause foaming and bubbling of the membrane, a particularly disadvantageous result. Excellent drying agents include calcium oxide, calcium chloride, potassium carbonate, magnesium sulfate, calcium sulfate, synthetic zeolites (molecular sieves), etc.

In addition to the physical property improvements which can be obtained by the use of the finely divided carbon black, other materials such as clay can be included for improved tear strength.

The membrane-forming coat materials can also include thixotropic agents. These agents can be any of the well-known materials sold for this purpose which are compatible with these extended urethanes. Another good thixotropic agent for these materials is the finely divided carbon black discussed above.

Yet another good thixotropic agent for polyurethane forming materials are polyureas formed from lower molecular mono- and di-amines and the polyisocyanates discussed above. These polyureas are particularly useful for spray applications on sloping surfaces using automatic two-component metering and mixing equipment. The premix includes the amine. When it is mixed with the polyisocyanate in the spraying equipment, the amine and polyisocyanate react very rapidly to produce the thixotropic agent. Generally, the great majority of the agent is formed by the time the mixture strikes the surface onto which it is being sprayed. The agent then prevents the runoff or slump of the membrane-forming coat.

Suitable amines for preparing these thixotropic agents include lower molecular weight mono- and di-amines containing from 6–30, preferably 12–22 carbons and 1 to 2 primary or secondary, preferably primary amine groups. Suitable amines include dodecylaniline, tall oil fatty amine, oleyl amine, and mixtures of two or more of these amines. One or more of these amines can also be used with small amounts of a diamine such as methyl imino bispropylamine. Since the diamine as well as the polyisocyanate cause crosslinking of the various molecules which form the polyurea, a very small amount, generally about 5% weight of the monoamines, is sufficient to impart a significant amount of additional thixotropy to that provided by the monoamine-derived polyureas.

Premix Preparation

The membrane coat is prepared by intimately mixing all the components of each of these materials. One method of accomplishing this is to bring each of the materials separately to the job site and mix them at this point. However, for convenience it is better to prepare a premix at a central location which is then activated with polyisocyanate at the job site.

A premix for the membrane coat comprises the extender, the high molecular weight polyol, the low molecular weight chain stiffener, the catalyst, fillers and the like. Usually only the polyisocyanate is not included. Generally, it is most convenient to disperse the fillers such as carbon black, clay and the like and the catalyst in the extender and thereafter blend in the high molecular weight polyol and the low molecular weight chain stiffeners. These premixes can then be brought to the jobsite in drums or tank trucks and used as needed.

The membrane-forming coat is prepared at the jobsite by mixing the premix with the polyisocyanate. This can be accomplished by any convenient mixing method, one of the most convenient being an ordinary cement or plaster mixer, particularly since they do not use any pumps, recirculating lines and the like which can be plugged by the cured membrane coat material.

Both the prime coat and the membrane coat can be applied in a variety of ways. Conveniently the membrane coat is applied with a squeegee having adjustable projections on the blade which hold the blade a fixed distance above the surface to be coated. When the membrane coat is mixed in a plaster mixer it is conveniently applied by using such a squeegee. Since the material is at least moderately self leveling, small imperfections introduced by the squeegee and the blade projections will smooth out and become insignificant.

An alternative method of applying the membrane coat material is by spray application. The membrane coat can be sprayed onto the surface. After the prime coat has been applied and after the required interval when the entrained gases have been allowed to escape, the membrane coat is sprayed on. Most conveniently the membrane coat is applied with 2-component automatic proportioning and mixing spray equipment. Using this equipment avoids the need to handle partially cured materials, as would be the case if the polyisocyanate is mixed with premix and then sprayed with single component spray equipment. Using 2-component spray equipment also allows increasing the level of the catalyst and thereby decreasing the setting rate from several hours to as little as 3–5 minutes.

The following examples further illustrate the invention. All parts are by weight unless otherwise specified.

EXAMPLES

Example 1

A section of a concrete bridge deck is cleaned by sweeping with a stiff broom and then blowing all remaining loose material off with compressed air. The deck is then sprayed with a prime coat having the composition set forth in Table I below at a rate of about 0.03 gallon per square yard. The prime coat is allowed to stand in the direct sunlight for at least 2 hours after which it becomes noticeably warmer and many air bubbles escape from the bridge deck surface.

TABLE I

| PRIME COAT COMPOSITION | |
|---|---|
| Material | Parts by Weight |
| Composition 1 | |
| An alkylated phenol/formaldehyde/tung oil varnish | 40 |
| Carbon Black | 2.5 |
| Paint Thinner (350° mid-point) | 60 |
| Composition 2 | |
| An alkyd resin | 25 |
| Carbon Black | 5 |
| Powdered Limestone | 40 |
| Paint Thinner | 50 |
| Thickener | 4 |

After the prime coat has warmed in the sun for at least 2 hours, and after the sun has reached it zenith, and during a period of falling surface temperature, the membrane coat is applied at a rate of 0.56 gallon per square yard (1/10 inch thickness) with two component metering, mixing and spraying equipment. The equipment is set to mix 100 parts by weight of a premix with 13.5 parts by weight of Jefferson Chemical Company's Thanate P-220. This is a polymeric polyisocyanate containing between 2.2 and 2.3 isocyanate groups per molecule. The composition of the premix is as shown in Table II below:

TABLE II

| MEMBRANE COATING PREMIX | |
|---|---|
| Component | Parts |
| A cut-back asphalt consisting of 80 volumes of 85/100 penetration | 50 |

TABLE II-continued

| MEMBRANE COATING PREMIX | |
|---|---|
| Component | Parts |
| asphalt and 20 volumes of a largely aliphatic low-boiling petroleum hydrocarbon having the midpoint of its boiling range at 265° F. | |
| polybutadiene diol (average molecular weight 2500 – 2800 | 42 |
| N,N-bis(2-hydroxypropyl)aniline | 6.7 |
| Dibutyl tin dilaurate | 0.01 |

The membrane is smooth and substantially free of bubbles and cured to touch in about 2 hours.

The following morning it is tack-coated with a light spray of 85/100 penetration asphalt applied at 310° F and then paved with a 1½ inches lift of hot asphalt concrete while the tack coat was still quite tacky. The asphalt concrete is given a pass with a roller immediately behind the paver. The following morning a second 1½ inches lift of asphaltic concrete is applied and rolled.

Conductivity tests indicate the membrane has a very high resistance to electrical current (even when wet on the surface) both before and after paving with the hot asphaltic concrete.

Example 2

A concrete surface once used as a driveway was swept clean with a stiff bristle broom. About 9:30 A.M. a prime coat (Composition 2, p. 21) was applied with paint brushes at the rate of 0.015 gallon per square yard over an 8-square-yard area. The prime coat was allowed to warm in the sun for 3½ hours. At 1:00 P.M. a membrane surfacing having the composition given in Table III was applied at the rate of 0.56 gallon per square yard, using rubber squeegees to distribute the material evenly over the designated area. The membrane cured to a smooth, glossy surface free of blisters, bubbles or pimples in about 2 hours.

TABLE III

| MEMBRANE COATING MATERIAL | |
|---|---|
| Component | Parts |
| Premix: | 50 |
| A cut-back asphalt consisting of 86 volumes of 50/65 penetration asphalt and 14 volumes of a largely aliphatic low-boiling petroleum hydrocarbon having the midpoint of its boiling range at 265° F. | |
| Polybutadiene diol (average molecular weight 2500 – 2800 | 42 |
| N,N-bis(2-hydroxypropyl)aniline | 6.7 |
| Dibutyl tin dilaurate | 0.01 |
| Activator: | |
| A modified methylene diphenyl diisocyanate (Isonate 143L, manufactured by Upjohn) | 14.4 |

What is claimed is:

1. A surface coated with a cast-in-place surfacing composition comprising, in order, from a the surface:
    A. a prime coat comprising: (1) a paint vehicle, (2) a dark heat absorbing filler, (3) a volatile solvent, and (4) optionally, an inert filler, and
    B. A membrane coat comprising 20 to 80 parts by weight of a polyurethane, 20 to 80 parts by weight of a substantially inert nonvolatile extender selected from the group consisting of cut-back asphalts and extender oils, and 0 to 20 parts by weight of a volatile solvent, said polyurethane formed by reacting a polyisocyanate with a polyurethane precursor at a mol ratio of 1.1–1.5:1, said polyurethane precursor of said membrane coat comprising 15 to 60 parts by weight of a high-molecular-weight polyol and 2 to 10 parts by weight of a low-molecular-weight chain stiffener.

2. The surface of claim 1 comprising, in order from the surface, (A) a prime coat comprising 15 to 70 parts by weight of (1) a paint vehicle, from 2 to 70 parts by weight of (2) a heat absorber, comprising a dark pigment, 20 to 75 parts by weight of (3) a volatile solvent, and 0 to 50 parts by weight of (4) a substantially inert filler, and (B) a membrane coat comprising 20 to 80 parts by weight of (1) a polyurethane formed by reacting 15 to 60 parts by weight of (a) a polyurethane precursor with 6 to 20 parts by weight of (b) a polyisocyanate, 20 to 80 parts by weight of (2) a substantially inert nonvolatile extender, and 0 to 20 parts of (3) a volatile solvent, wherein said membrane coat comprises 40 to 60 parts by weight of said polyurethane, 40 to 60 parts by weight of said extender and 0 to 10 parts by weight of said volatile solvent, wherein said polyurethane of said membrane coat is formed by reacting 10 to 15 parts by weight of a polyisocyanate with 30 to 55 parts by weight of a polyurethane precursor at a mol ratio of 1.1–1.5:1, said polyurethane precursor comprising 30 to 55 parts by weight of a high molecular weight polyol and 4 to 8 parts by weight of a low molecular weight chain stiffener.

3. The surface of claim 2 wherein said prime coat has a thickness of 0.001 to 0.010 inch.

4. The surface of claim 3 wherein said membrane coat has a thickness of 1/50 to ½ inch.

5. The surface of claim 4 wherein said high-molecular-weight polyol has an average molecular weight of 1,800 to 3,000.

6. The surface of claim 5 wherein said low-molecular-weight chain stiffener is selected from 1,4-butanediol, 1,4-bis(hydroxymethyl)cyclohexane and N,N,bis(2-hydoxypropyl)aniline.

7. The surface composition of claim 6 wherein said low molecular weight chain stiffener is N,N-bis(2-hydroxypropyl)-aniline.

8. The surface composition of claim 7 wherein the mol ratio of the isocyanate reactive groups of said low molecular weight chain stiffener to the isocyanate reactive groups of said high molecular weight polyol is from 1.5–2.5:1.

9. The surface of claim 8 comprising, in order, from a coated surface: (A) said prime coat, (B) said membrane coat, (C) a tack coat comprising asphalt, and (D) a wearing surface coat comprising asphalt concrete.

10. The surface of claim 9 wherein the asphalt of said tack coat has a penetration of 70 to 120 and the wearing surface coat has a thickness of ¼ inch to 6 inches.

11. The surface of claim 10 wherein said wearing surface coat has a thickness of 1–4 inches.

12. A process for coating a surface comprising:
    A. Applying a prime coat to said surface, said prime coat comprising: (1) a paint vehicle, (2) a dark heat absorbing filler, (3) a volatile solvent, (4) optionally, an inert filler,
    B. Allowing said prime coat to stand for a time sufficient to allow entrained gases to escape from said coat and said primed surface,
    C. Applying to the surface of the prime coat a membrane-forming coating comprising: (1) 15 to 60 parts by weight of a polyurethane precursor, (2) 20 to 80 parts by weight of a substantially inert nonvolatile extender selected from the group consisting of cut-back asphalts and extender oils, (3) 6 to 20 parts by weight of a polyisocyanate, (4) 0 to 20 parts by weight of a volatile solvent, and (5) 0 to 1.0 part by weight of a polyurethane-forming reaction catalyst, wherein said polyurethane precursor comprises 15 to 60 parts by weight of a high molecular weight polyol and 2 to 10 parts by weight of a low molecular weight chain stiffener, wherein said membrane coat is applied a minimum of two hours after application of said prime coat and during a period in which the temperature of the primed surface is not rising.

13. A process for coating a surface comprising:
A. Applying a prime coat to said surface, said prime coat comprising: (1) a paint vehicle, (2) a dark heat absorbing filler, (3) a volatile solvent, and (4) optionally, an inert filler,
B. Allowing said prime coat to stand for a time sufficient to allow entrained gases to escape from said coat and said primed surface,
C. Applying to the surface of the prime coat a membrane-forming coating comprising: (1) 15 to 60 parts by weight of a polyurethane precursor, (2) 20 to 80 parts by weight of a substantially inert nonvolatile extender selected from the group consisting of cut-back asphalts and extender oils, (3) 6 to 20 parts by weight of a polyisocyanate, (4) 0 to 20 parts by weight of a volatile solvent, and (5) 0 to 1.0 part by weight of a polyurethane-forming reaction catalyst, wherein said polyurethane precursor comprises 15 to 60 parts by weight of a high molecular weight polyol and 2 to 10 parts by weight of a low molecular weight chain stiffener, wherein said membrane coat is applied a minimum of two hours after application of said prime coat and during a period in which the temperature of the primed surface is not rising,
D. Applying to the surface of said membrane-forming coat a tack coat comprising molten asphalt having a penetration of 70 to 110, and
E. Applying to the surface of said tack coat an asphalt concrete comprising 3 to 12 parts by weight of an asphalt having a penetration of 70 to 150 and 88 to 97 parts by weight of a mineral aggregate.

14. The process of claim 13 wherein said asphalt concrete is applied to yield a compacted thickness of ¼–6 inches.

* * * * *